Feb. 10, 1959 J. R. PADRICK 2,872,883
PLANTER RUNNER GUARD
Filed April 20, 1954
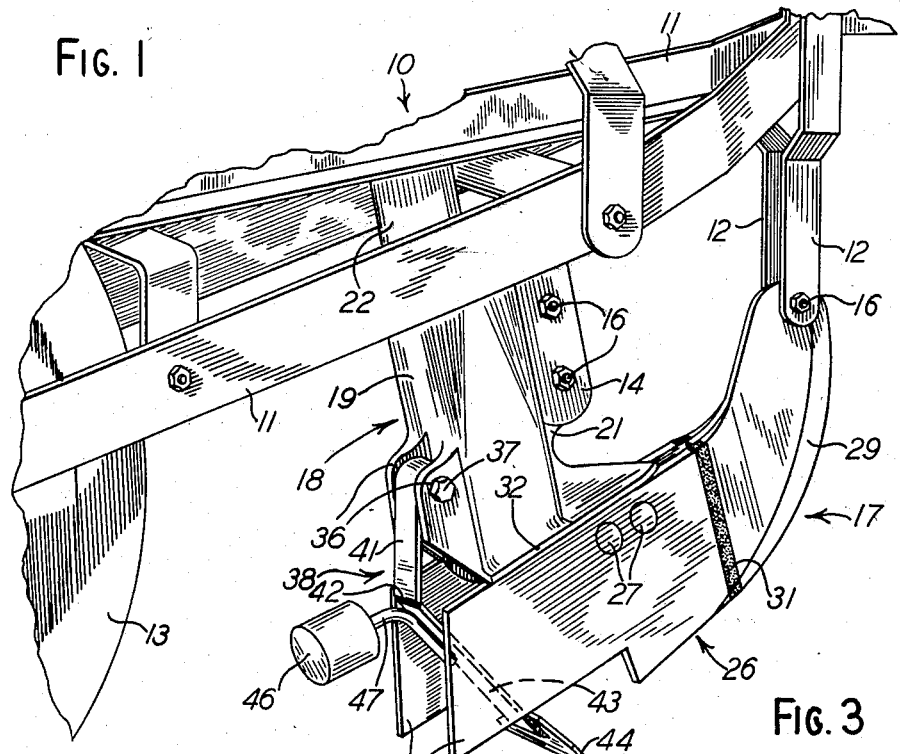
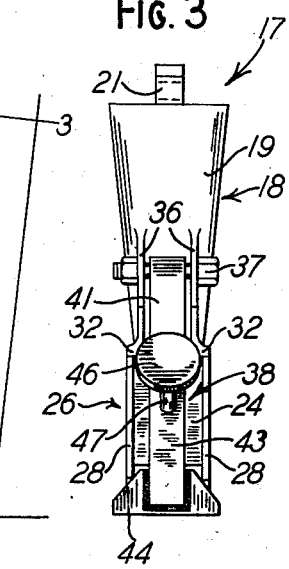
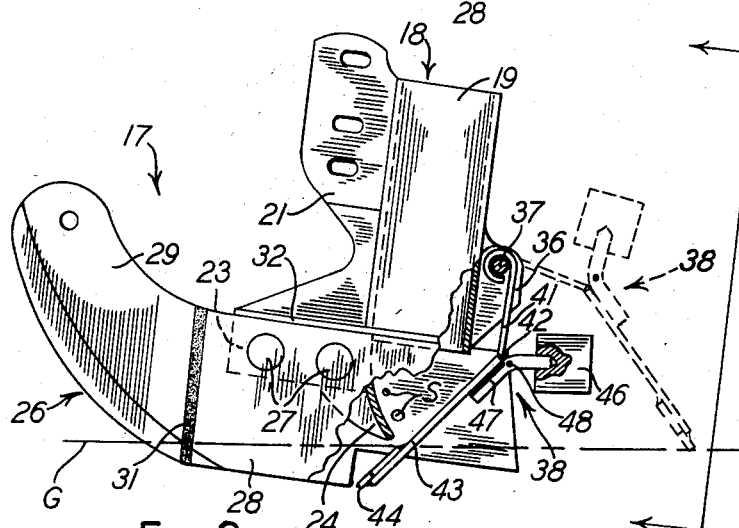
INVENTOR:
JOHN R. PADRICK
BY:
AGENT

United States Patent Office 2,872,883
Patented Feb. 10, 1959

2,872,883

PLANTER RUNNER GUARD

John R. Padrick, Anniston, Ala., assignor to J. I. Case Company, Racine, Wis., a corporation of Wisconsin Application April 20, 1954, Serial No. 424,331

2 Claims. (Cl. 111—86)

This invention pertains to an agricultural planter, and, more particularly it pertains to a planter runner guard.

Present day planters are predominantly mounted implements which are conveyed along the plowed ground to deposit the seed as desired. To place an implement of this type into its working position, it is generally dropped into the ground at the beginning of the row to be planted. In dropping the implement, frequently the runner has the plowed soil rammed into it and the opening is then clogged, preventing the seed from being discharged onto the ground.

It is, therefore, a primary object of this invention to provide a planter which will not clog with soil when dropped onto the ground to commence planting operations.

A further object of this invention is to provide a planter with means which will overcome the problem of clogging with soil when dropped onto the ground for planting operations with said means being readily and easily mounted onto an already existing type of planter and thereby overcoming the problem mentioned.

A further object of this invention is to improve upon prior planters which have been designed to meet the problem mentioned.

Other objects and advantages will become apparent upon reading the following description in conjunction with the accompanying drawing wherein, Fig. 1 is a rear perspective fragmentary view of a planter in a preferred embodiment of this invention.

Fig. 2 is a side elevational view of a part of the planter shown in Fig. 1 with said part being in an approximate operating position.

Fig. 3 is a rear elevational view of the part shown in Fig. 2 viewed from the line 3—3 of Fig. 2.

Similar reference numerals refer to similar parts throughout the three views.

Referring to Fig. 1, there is shown a fragment of a planter which is preferably attached to the rear end of a tractor (not shown). The planter comprises a frame 10 having structural members 11. Attached to the members 11 to depend substantially vertically therefrom is a pair of runner front braces 12, while a press wheel 13, a fragment of which is shown, is rotatably mounted on the rear end of the planter frame. Also attached to the frame 10, intermediate the braces 12 and the wheel 13, is a mounting plate 14 which depends substantially vertically below the frame 10. Suitably attached to the frame 10, through the braces 12 and the plate 14 by bolts 16, is a planter runner assembly 17 which will be described in detail hereinafter.

The assembly 17 comprises a boot or generally cylindrical seed tube 18 which consists of a substantially vertically disposed tubular body portion 19 and a forwardly located mounting bracket 21. The bracket 21 is a part of the runner assembly which attaches to the plate 14. The body portion is in communication with a seed tube 22 or the like, which drops the seeds, designated "S," through the tube and onto the ground. Fig. 2 shows the tubular body 19 and the mounting bracket 21 in addition to showing, in dotted lines, a base 23 which is an integral part of the boot 18. Also, extending downwardly and rearwardly from the base 23 is a tongue 24 which forms a continuation of the front side of the tubular body 19 for a later mentioned purpose. It should now be noted that a vertical passageway is provided through the body 19 and past the tongue 24.

As shown in Figs. 1 and 2, a runner 26 is attached to the boot 18 by rivets 27 or the like which engage both the runner 26 and the base 23 of the boot. It is preferred that the rivets 27 be flush with the sides of the runner to avoid catching things when the runner is moved through the soil. The runner 26 consists of a pair of horizontally spaced apart and vertically disposed side plates 28 and a forwardly located upturned plate 29 which is welded to the plates 28 as at 31. It should be noted that the plates 28 converge at their front ends where they join with the plate 29 at which point it is preferred that a fill material be applied to the sides of the runner to form smoothly converging sides as shown. The rear ends of the plates 28 are shown to extend beyond the rearward limit of the boot body portion 19. Also, a flange 32 of the boot 18 abuts the upper edges of the plates 28 to render the runner assembly rigid.

From the foregoing description, it should be understood that a generally conventional planter assembly is provided. The operation thereof is such that the planter is moved forwardly through plowed soil with the upturned plate 29 at the forward end to form a furrow in the soil with the assistance of the plates 28. The line designated "G" in Fig. 2 represents the ground or soil line. The tongue 24 then moves along the furrow to guide the seeds S into the furrow as the seeds are discharged through the boot tube 19. However, as previously mentioned, before the planter is in operation, it is dropped into the soil from an elevated position. In dropping it, soil frequently packs into the runner at the bottom of the boot body 19 and prevents the seeds from being deposited into the furrow. Therefore, the following describes the manner in which this problem is overcome.

As shown in Fig. 1, a pair of mounting plates 36 is preferably attached to the rear of the boot body portion 19 to be vertically disposed and spaced apart. A bolt 37 is horizontally attached between the plates 36 to pivotally support a depending balanced guard assembly, generally designated 38, which extends downwardly between the rearward spaced apart plates 28. As shown best in Fig. 2, the guard 38 preferably comprises an upper hinge or arm 41 which is hooked at its upper end to pivotally engage the bolt 37. The lower end of the arm 41 is preferably welded at 42 to an upper end of a second arm or plate 43 which is angled to the arm 41 to be inclined downwardly and forwardly therefrom as shown. The lower end of the arm 43 then projects to approximately the bottom edges of the plates 28. In this arrangement, it should be noted that the arm or plate 43 is disposed across the lower opening of the boot body portion 19. Attached preferably by welding to the front side of the lower end of the plate 43 is a paddle 44 which is wider than the lateral limits of the planter runner plates 28, as shown in Fig. 3. To complete the guard assembly, a counter weight 46 is secured to the rear side of the assembly by preferably being mounted on a rod 47 which is welded to the plate 43. In this manner, the center of gravity of the assembly 38 can be made to lie somewhere along a line formed through the axis of the bolt 37 and the point 48 on the rod 47.

Thus, when the planter is first dropped onto the soil, the guard assembly 38 is in the position shown in Fig. 1 and in the solid line position of Fig. 2. Then when the planter is moved forward, the soil engages the paddle 44 to hold it in position until it reaches the position shown by the dotted lines of Fig. 2. In so retracting the assembly 38, the arm 43 removes any soil which may have packed into the lower outlet of the boot body 19 and between the plates 28. During the continued forward movement, the assembly 38 remains in the retracted position with the paddle 44 riding along the ground line G as indicated. Upon lifting the planter from the ground, the assembly 38 returns to its original position by the effect of the weight 46 shown in solid lines in Fig. 2. However, the paddle 44 abuts the lower edges of the runner plates 28 to prevent the assembly from swinging forwardly beyond approximately the position shown.

While a specific embodiment of this invention has been shown and described, the scope thereof should be limited only by the appended claims.

I claim:

1. A planter having a body, a pair of spaced vertically-positioned plates mounted thereon, and a seed discharge means extending intermediate said plates and having a downwardly directed opening, in combination, a guard pivotally mounted on said body and depending intermediate said plates, a counterweight secured to said guard in a manner so as to urge the latter forwardly intermediate said plates to a position directly under and blocking said opening, said guard projecting downwardly below said plates so as to engage the soil and urge said guard rearwardly to uncover said opening when said planter is transported forwardly.

2. A planter having a body provided with a downwardly-directed seed discharge passageway, in combination, a guard pivotally mounted on said body and having a portion adjacent said opening, a counterweight secured to said guard in a manner so as to urge said portion forwardly so as to block said downwardly-directed opening, said guard extending downwardly so as to engage the soil and urge said guard rearwardly when said planter is in operation and being transported forwardly.

References Cited in the file of this patent

UNITED STATES PATENTS

| | | |
|---|---|---|
| 419,095 | Young | Jan. 7, 1890 |
| 471,728 | Yarbrough | Mar. 29, 1892 |
| 611,980 | Smith | Oct. 4, 1898 |
| 789,798 | Deterding | May 16, 1905 |
| 2,416,189 | McIntyre | Feb. 18, 1947 |
| 2,554,205 | Oehler | May 22, 1951 |